United States Patent [19]
Kawaharata

[11] Patent Number: 5,410,585
[45] Date of Patent: Apr. 25, 1995

[54] SUBSCRIBER LINE TEST SYSTEM

[75] Inventor: Satoru Kawaharata, Tokyo, Japan

[73] Assignee: NEC Corporation, Tokyo, Japan

[21] Appl. No.: 948,446

[22] Filed: Sep. 22, 1992

[30] Foreign Application Priority Data

Sep. 25, 1991 [JP] Japan .................................. 3-245363

[51] Int. Cl.6 ........................ H04M 3/30; H04M 3/32
[52] U.S. Cl. ......................................... 379/6; 379/27;
379/29
[58] Field of Search ..................... 379/2, 5, 6, 27, 29

[56] References Cited

U.S. PATENT DOCUMENTS

| 4,688,209 | 8/1987 | Banzi, Jr. et al. | 370/15 |
| 4,864,597 | 9/1989 | Fore | 379/6 |
| 5,166,923 | 11/1992 | Ohmori et al. | 370/15 |

FOREIGN PATENT DOCUMENTS 61-77460  4/1986 Japan .
61-239729 10/1986 Japan .

Primary Examiner—Stephen Chin
Assistant Examiner—Kevin Kim
Attorney, Agent, or Firm—Sughrue, Mion, Zinn, Macpeak & Seas

[57] ABSTRACT

A method and apparatus for testing a subscriber line of a communication exchange. A telephone coupled to the subscriber line is used to dial first and second specified telephone numbers to couple the subscriber line to a bit error rate measurement device, housed in a talking circuit switch, and to designate channels of the subscriber line to be tested. The bit error rate measurement device transmits bit error rate measurement signals through the designated channels and uses these bit error rate measurement signals to generate bit error rate signals indicating the bit error rates of the channels. The bit error rates are represented as audible sounds transmitted to the telephone. Accordingly, it is possible to start the test from customer station equipment, to evaluate the quality of digital transmission through the channels, and to specify the fault points of the channels by repeating bit error rate measurements in different channel paths.

4 Claims, 4 Drawing Sheets

SUBSCRIBER LINE TEST SYSTEM

BACKGROUND OF THE INVENTION

This invention relates to a subscriber line test system to be carried out for maintenance of a subscriber line connecting a customer station equipment and an exchange.

In a conventional subscriber line test system, to detect disconnection, earth fault and contact with electric wire in a subscriber line, at first a subscriber line to be tested is selected on a line test table of exchange, next, analog parameters such as insulation resistance and capacity between subscriber lines and voltage to ground are measured.

A digital subscriber line test system, which is shown in Japanese Patent Laid-Open No. 77460/1986, is proposed to test in a digital subscriber line transmission system using installed metallic cable in such steps of providing a relay and a terminating resistor for matching, operating said relay with a line terminating device in said end terminal by receiving a demanding signal for testing from an office, cutting off said digital subscriber line in a fixed time from the line terminating device in said terminal side, mutually releasing said digital subscriber lines or terminating by using said terminating resistor for matching, and in this time, testing said digital subscriber line with a subscriber line test device installed in said office.

This conventional subscriber line test system, however, has problems as below. For example, it is impossible to start a test from a customer station equipment at working for the customer station device, because selection of the subscriber line to be tested is done on the side of the exchange, more it is impossible to determine which side of a subscriber line or a subscriber circuit has fault points. Also testing items are matched to a transmission system of a conventional analog type, it is difficult to evaluate the problems such as instantaneous cut of the subscriber line, deterioration of transmission quality by interference of noise, or the like that are especially serious at digital transmission.

Further, another digital subscriber line test system, which is shown in Japanese Patent Laid-Open No. 239729/1986, is proposed. The proposed system is comprised of a signal processing section and a line interface section, wherein said signal processing section has a transmission channel for control signals and a reception channel of control signals between a line terminating section through said line interface section, and in a digital terminal device wherein said line interface section has a channel for echo control signals receiving echo control signals sent back from said line terminating section, when said line interface section receives a test mode signal from said signal processing section, it transmits an echo control signal transmitted from said line terminating section through the channel for said echo control signal, to said signal processing section through the channel for said control signal.

However, even using the proposed arts, only a few subscriber lines can be measured when testing subscriber lines. So that this art is also in dissatisfaction.

SUMMARY OF THE INVENTION

The object of this invention is to offer a subscriber line test system to solve the problems in conventional arts, by starting and performing a test for its subscriber line and subscriber circuit with connecting from a customer station equipment to a measurement device installed in an exchange.

The object of this invention is achieved by a subscriber line test system to test a subscriber line connecting a customer station equipment and an exchange, comprising:

a network terminating device terminating said subscriber line on the side of said customer station equipment, cutting off the side of said customer station equipment and the side of said subscriber line of an assigned channel when receiving a reflection indication through the subscriber line, forming a reflection circuit at least on the side of said subscriber line by connecting a transmission and reception path, and simultaneously releasing said reflection circuit when receiving a reflection release signal;

a subscriber circuit housed in and connected with the talking circuit switch of said exchange, terminating said subscriber line on the side of said exchange, cutting off the side of said subscriber line and the side of said talking circuit switch of the assigned channel when receiving a reflecting indication, forming a reflection circuit at least on the side of said talking circuit switch by connecting a transmission and reception path, and simultaneously releasing said reflection circuit when receiving a reflection release signal;

a bit error rate measurement device housed in and connected with said talking circuit switch, transmitting a bit string through the transmission path of said talking circuit switch when started, measuring a bit error rate by comparing both of transmission and reception digital signals only in a pre-determined time when received the sent bit string from the reception path of the same channel, outputting a plurality of bit error rates as measurement result information;

an audible sound transmission device transmitting audible sounds of a digital signals through said talking circuit switch, wherein multiple audible sounds of digital signals are installed and one of the signals is selected by an external indication; and a control device, assigning a channel of the received subscriber line and connecting the assigned channel to said bit error rate measurement device when receiving the first specified address code for a subscriber line test from said customer station equipment, and simultaneously driving the bit error rate measurement device to start the measurement and indicating said network terminating device to set up reflection of the transmission and reception path, next, indicating reflection releasing to said network terminating device when receiving a result of the bit error rate from said bit error rate measurement device, assigning the channel of the subscriber circuit facing to the received subscriber line and connecting the assigned channel with said bit error rate measurement device by indicating said talking circuit switch when received second specified address code from said customer station equipment, and simultaneously driving the bit error rate measurement device and indicating said subscriber circuit to set up reflection of the transmission and reception path, next, indicating reflection releasing to said subscriber circuit when received a result of the error rate measurement from the bit error rate measurement device.

More, in said subscriber line test system, it is desirable that the audible sound transmission device is comprised of a clock signal generating device to output a reference clock signal, a counter to count up by said reference clock signal, a nonvolatile memory to output data by being indicated an address with a value of said counter, a time slot converting device to convert the data inputted from the nonvolatile memory to a time slot.

More, in said subscriber line test system, it is desirable that the control device is comprised of a central control device indicating reflection by recognizing that the first specified address code and second specified address code are starting demands of a reflection test and indicating reflection releasing when the talking circuit is switched from the bit error rate measurement device to the audible sound transmission device, a subscriber line control device to instruct reflection indication and reflection releasing indication to the network terminating device after receiving said indication from said central control device, and a talking circuit control device receiving measurement result information outputted from the bit error rate measurement device, indicating the talking circuit switch to cut off the path for the bit error rate measurement device and connect with the audible sound transmission device, and simultaneously informing switching information to said central control device.

More, in said subscriber line test system, it is desirable that the nonvolatile memory is comprised to store digital patterns of audible sound in expected frequencies.

More, in said subscriber line test system, it is desirable that the central control device is comprised of means to control the talking circuit control device and the subscriber line control device through a system bus.

Further more, in said subscriber line test system, it is desirable that the talking circuit switch characterizing to house a bit error rate measurement device and an audible sound transmission device.

The subscriber line test system of this invention has a configuration providing a plurality of specified dial codes from a customer station equipment setting a talking channel used by the subscriber at the time in a condition of a loop back in the path corresponding to each specified dial code when the measurement device starts, measuring a bit error rate in a pre-determined time, and indicating the measurement result in audible sound with digital signals for a caller. As the result, the system by this invention is effective to start a test from a customer station equipment, to evaluate the quality of digital transmission and to specify the deficient points by repeating measurement of various bit error rates in different paths.

Also, even if using the art proposed in Japanese Patent Laid-Open No. 77460/1986, any bit error rates can not be measured worthy of digital transmission evaluation. More, in the art of Japanese Patent Laid-Open No. 77460/1986, as the test starts from the side of the exchange, the problem that the communication for test request is needed occurs.

Further, even if using the art proposed in Japanese Patent Laid-Open No. 239729/1986, only the subscriber line between the digital terminal device and the line terminating device, that is the subscriber line of the customer station can be tested whether it is good or not. Being different from this invention, it can not test whether the subscriber line between the network terminating device and the exchange, where the bit error and faults occur easily and confirmation of normal transmission is important to maintenance the line, is good or not.

DESCRIPTION OF THE CODE NUMBERS

Figure 1:
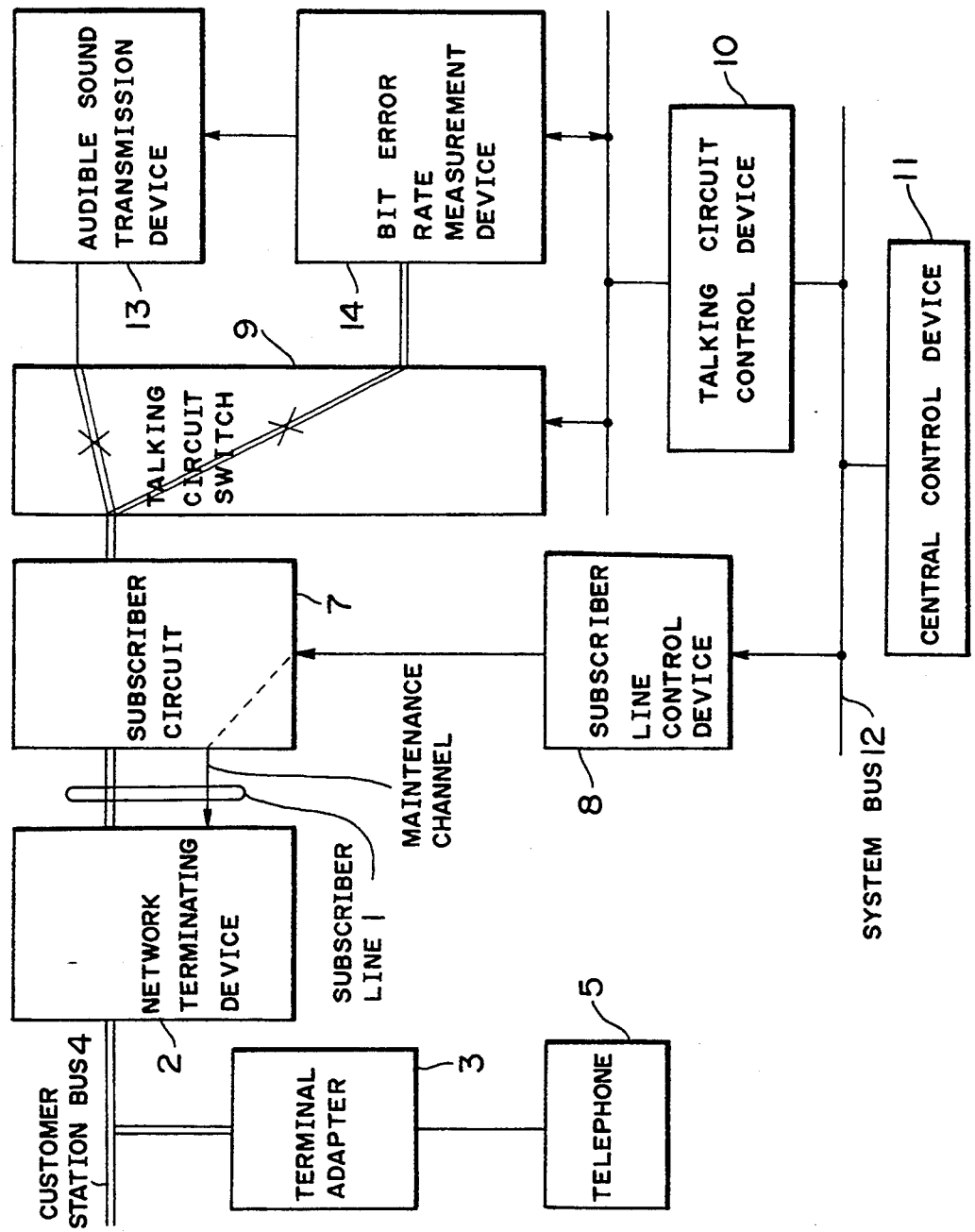
FIG. 1 is a functional block diagram showing an embodiment of a subscriber line test system by this invention.

1 A subscriber line
2 A network terminating device
3 A terminal adapter
4 A customer station path
5 A telephone
7 A subscriber circuit
8 A subscriber line control device
9 A talking circuit switch
10 A talking circuit control device
11 A central control device
12 A system bus
13 An audible sound transmission device
14 A bit error rate measurement device
15 A counter
16 A clock signal generating device
17 A nonvolatile memory
18 A time slot converting device

DETAILED DESCRIPTION OF THE INVENTION

Figure 4:
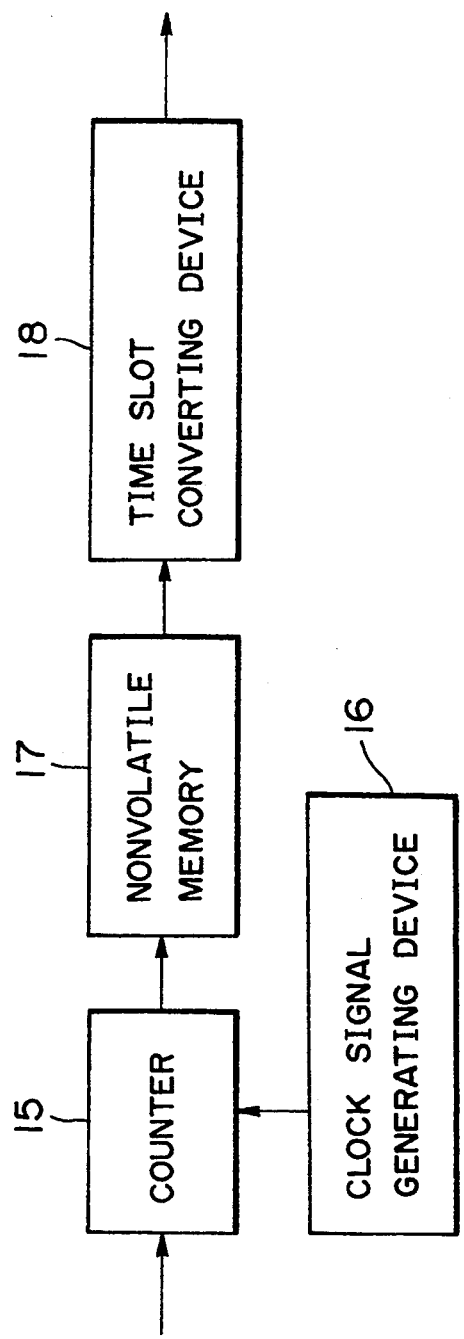
FIG. 4 is a block diagram showing an embodiment of an audible sound transmission device.

Next, referring to the figures, the invention is described. FIG. 1 is a functional block diagram showing an embodiment of the subscriber line test system of this invention, FIG. 4 is a functional block diagram showing an embodiment of an audible sound transmission device of this invention.

The subscriber line 1 connects the network terminating device 2 and the subscriber circuit 7. On the side of the customer station, the terminal adapter 3 connects to the network terminating device 2 with the customer station bus 4. A telephone 5 is connected with the terminal adapter 3. On the side of the exchange, the subscriber line 1 is terminated with the subscriber circuit 7 controlled by the subscriber line control device 8. In this point, the talking circuit channel of the subscriber is housed in the talking circuit switch 9, the connection is controlled by the talking circuit control device 10. Also, the audible sound transmission device 13 using digital codes and bit error rate measurement device 14 are housed in the talking circuit switch 9. Starting of the audible sound transmission device 13 is done based on a bit error rate from the bit error rate measurement device 14. The talking circuit path connecting the talking channel of the subscriber circuit 7 and the audible sound transmission device 13 and the talking circuit path connecting the channel of the subscriber circuit 7 and the bit error rate measurement device 14 are controlled by the indication of the talking circuit control device 10.

The central control device 11 controls the talking circuit control device 10 and the subscriber line control device 8.

Figure 2:
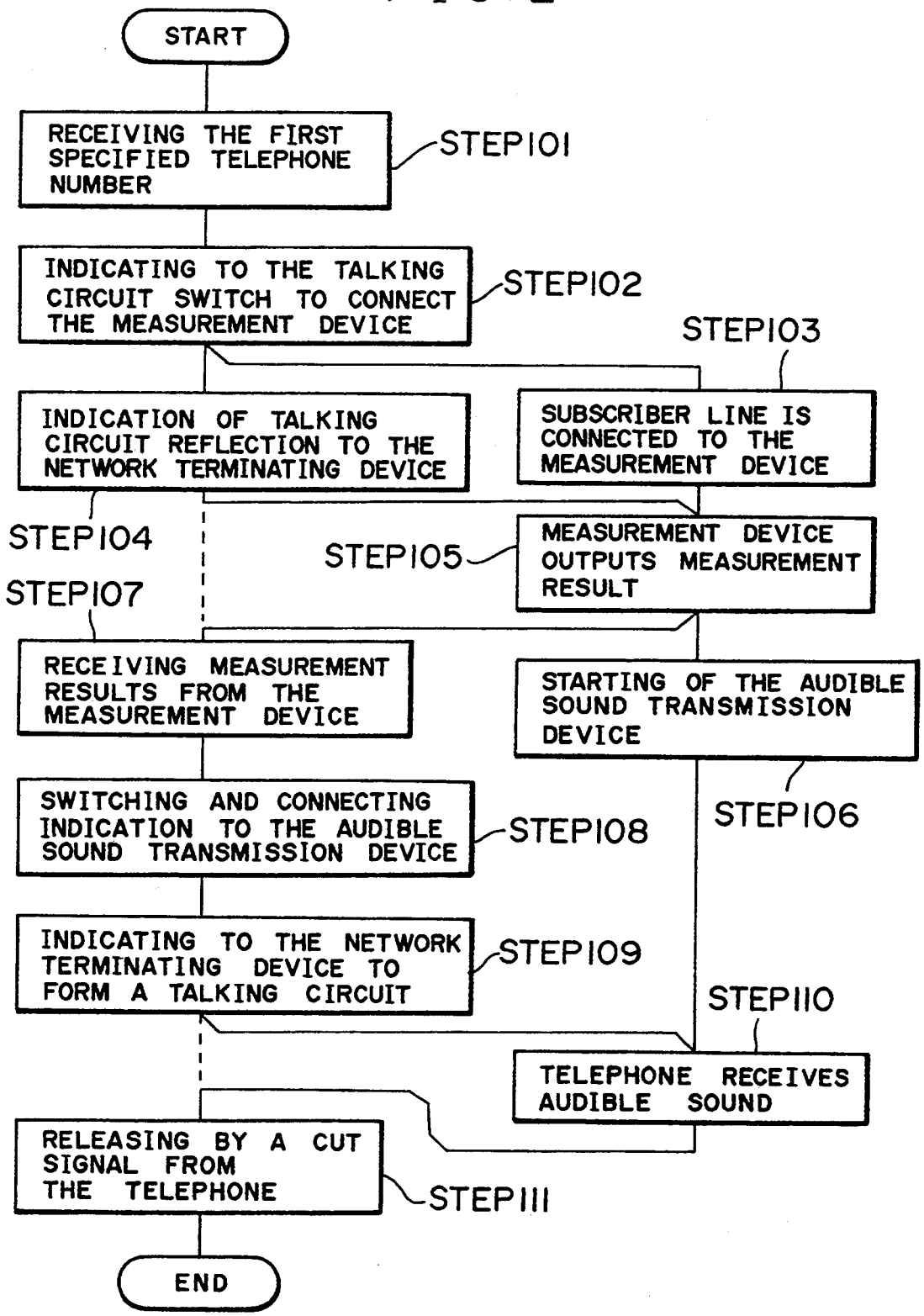
FIG. 2 is a flow chart showing an embodiment of a main procedure mainly consisting of the operations when a central control device in FIG. 1 receives the first specified telephone number.
Figure 3:
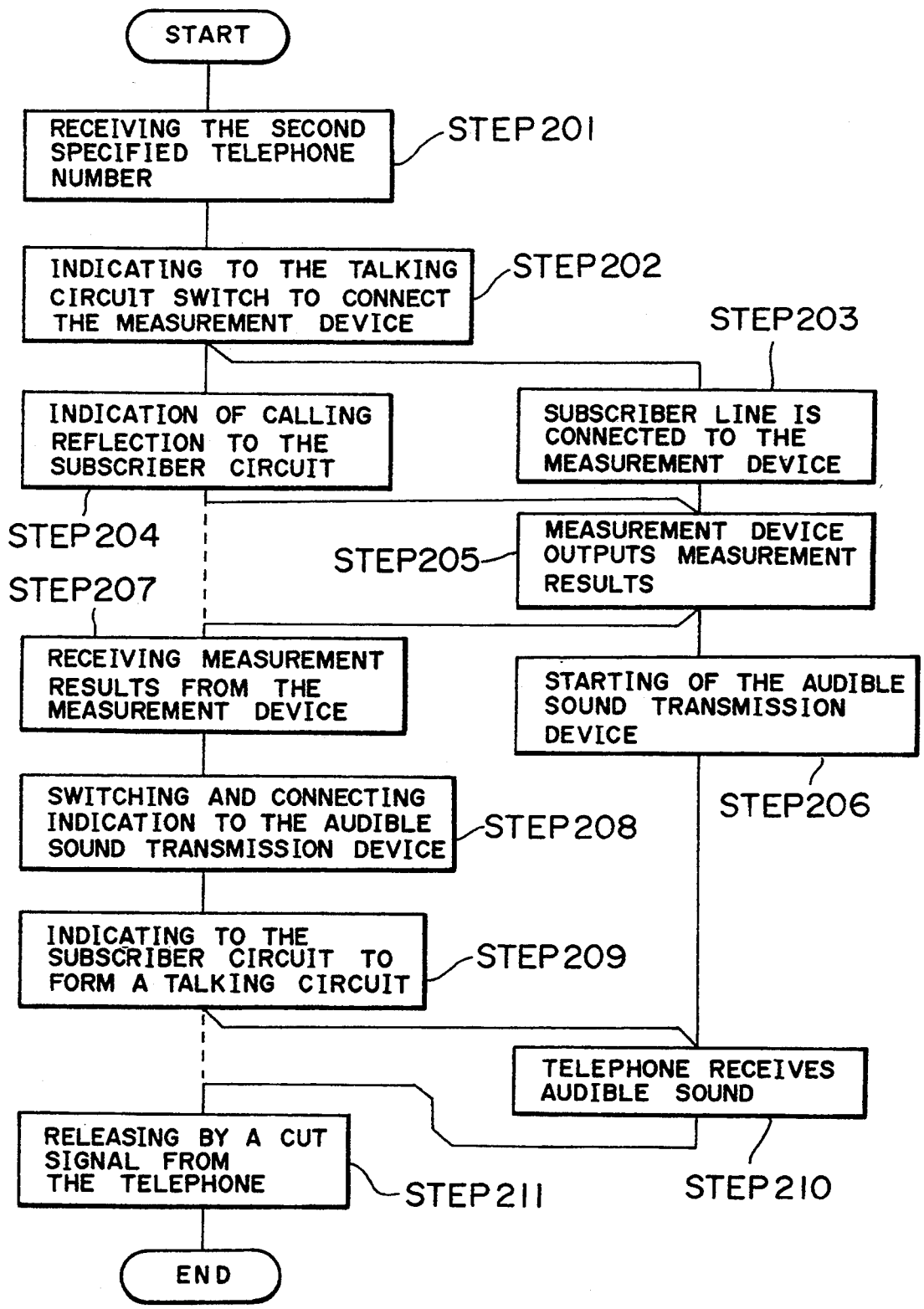
FIG. 3 is a flow chart showing an embodiment of a main procedure mainly consisting of the operations when a central control device in FIG. 1 receives the second specified telephone number.

Referring FIG. 2 and FIG. 3, the operation of the embodiment is explained. FIG. 2 is a flow chart showing an embodiment of a main procedure mainly consisting of the operation when the central control device in FIG. 1 receives the first specified telephone number, and FIG. 3 is a flow chart showing an embodiment of a main procedure mainly consisting of the operation when the central control device in FIG. 1 receives the second specified telephone number.

When a subscriber line test starts, at first, a connection demand is sent to the exchange by dialing, from the telephone 5 that is a customer station equipment. Receiving (step 101) the first specified telephone number from the telephone 5, the central control device 11 in the exchange connects (step 102) the talking circuit of the subscriber line 1 to the bit error rate measurement device 14 by controlling the talking circuit control device 10 and talking circuit switch 9 basing on the usual calling control procedure, and closes the talking circuit path. That is, a talking circuit connecting the telephone 5 and the error rate measurement device 14 (step 103) through the terminal adapter 3, the customer station bus 4, the network terminating device 2, the subscriber line 1 and the subscriber circuit 7 is formed.

Recognizing that receiving of the first specified telephone number is a starting demand of a reflection test for the subscriber line from the customer station equipment, the central control device 11 issues a reflection instruction for the talking channel presently used in the subscriber line 1 to the subscriber line control device 8. Receiving this signal, the subscriber line control device 8 sends out the reflection instruction to the network terminating device 2 through the channel for maintenance defined in the interface between the subscriber and the network (step 104). Decoding the indication, the network terminating device 2 reflects, leaving as it is, the bit string sent from the exchange in the talking channel, and simultaneously reflects, leaving as it is, the bit string from the terminal adapters to the same terminal adapters. By this operation, a reflection path connecting the bit error rate measurement device 14 the subscriber circuit 7 the subscriber line 1, the network terminating device 2 the subscriber line 1 the subscriber circuit 7 and the bit error rate measurement device 14 is formed.

After the reflection path is formed, driven by the talking circuit control device 10, in a pre-determined time, the bit error rate measurement device 14 starts to send out pseudorandom digital bit signals to the side of the talking circuit switch. The sent out pseudorandom digital bit signals are reflected at the network terminating device 2, the bit error rate measurement device 14 receives the signals. The bit error rate measurement device 14 compares the sent out pseudorandom digital bit signals with the received signals in each bit, and calculates the bit error rate of the talking circuit path including the subscriber line. On the other hand, the path, which is passing through the telephone 5, the terminal adapter 3 and customer station bus 4 and is reflected at the network terminating device 2, prevents that the pseudorandom digital bit signals in said bit error rate measurement are converted to audible sound and reached to the telephone.

Next, in the pre-determined time, the bit error rate measurement device 14 that has measured the bit error rate outputs the result to the talking circuit control device 10 (step 105), and the audible transmission device 13 is started to send one of the audible frequencies corresponding to the result of the bit error rate (step 106). The started audible sound transmission device 13 transmits the audible sound signals of specified digital codes corresponding to the bit to the side of the subscriber circuit 7 via the talking circuit switch 9. The talking circuit control device 10, which has received (step 107) the measurement result information output from the bit error rate measurement device 14 in the step 105, indicates the talking circuit switch 9 (step 108) to cut off the path for the bit error rate measurement device 14 and connect the audible sound transmission device 13 with the subscriber circuit 7, and provides the switching indication to the central control device 11. By this information, the central control device 11 indicates (step 109), through the channel for maintenance from the subscriber circuit 7, the network terminating device 2 to release the reflection path. More, in the audible sound transmission device, when the reset counter 15 is released, the counter 15 starts to count up in accordance with the reference clock signal that is output from the clock signal generating device 16. A value, which is converted to all address value corresponding to the address value of the nonvolatile memory 17 corresponding to that bit error rate measured by the bit error rate measurement device 14, is stored. This audible sound data is thus output from the nonvolatile memory, which audible sound data, representing an audible frequency line to the time slot converting device 18. The time slot converting device 18 outputs the input data to the talking circuit switch 9 during a time period. Consequently, the telephone 5 receives (step 110) the audible signal transmitted in step 106 through the talking circuit path formed in the step 108 and the step 109, that is through the audible sound transmission device 13, the talking switch 9, the subscriber circuit 7, the network terminating device 2 and terminal adapter 3.

Assuming that the audible sound of 400 Hz means that the bit error rate is less than $1/10^5$ and the audible sound of 1000 Hz means that the bit error rate is more than $1/10^5$, the maintenance personnel at the customer station knows that the work is done well when listening sound of 400 Hz, also knows the installed subscriber line is in bad condition when listening sound of 1000 Hz. The indication condition of the result is released (step 111) by the cut signal from the calling telephone 5.

Usually, as the bit error rate is regarded as zero in the talking circuit path passing through the talking circuit switch 9 that is the internal device of the exchange, the bit error rate of said talking circuit path is substantially and approximately equal to the bit error rate caused by transmission deterioration in the subscriber line or some circuit faults and deterioration of function in the subscriber circuit.

Next, to distinguish that said bit error is caused by which transmission deterioration in the subscriber line or some circuit faults or deterioration of function in the subscriber circuit, the maintenance personnel continues the following reflection test. In this case, from the telephone 5 on the side of the customer station, the second specified telephone number transmission device 13 is dialed and a connection demand is sent out to the exchange. When the central control device 11 receives (step 201) the second specified telephone number, it connects (step 202), in the same way to the above, the talking circuit of the subscriber circuit 7 to the bit error rate measurement device 14. At this time, the talking circuit connecting (step 203) between the bit error rate measurement device 14 and the subscriber circuit 7 is formed.

Receiving the second specified telephone number and recognizing it as a starting command from the side of the customer station equipment for the subscriber circuit reflection test, the central control device 11 indicates (step 204) reflection of the talking channel to the subscriber circuit 7. According to this indication, while the subscriber circuit 7 reflects, leaving as it is, the bit string of the talking channel that is sent out from the bit error rate measurement device 14 via the talking circuit switch 9, it reflects, leaving as it is, the bit string from the side of the subscriber line 1 to the side of the subscriber line 1. At this time, the reflection path connecting the bit error rate measurement device 14, the subscriber circuit 7 and the bit error rate measurement device 14 is formed.

After being driven by the talking circuit control device 10, in the pre-determined time, the bit error rate measurement device 14 sends out the pseudorandom digital bit signal to the side of the talking circuit switch 9. The sent out signal is reflected on the side of the talking circuit switch 9 in the subscriber circuit 7, and is received by the bit error rate measurement device 14. Similarly to the operation in the case of the first specified telephone number, the bit error rate measurement device 14 measures the bit error rate, outputs (step 205) the result to the talking circuit control device 10, and simultaneously the audible sound transmission device 13 is started (step 206) to send one of the audible frequencies corresponding to a particular bit error rate. The started audible sound transmission device 13 sends out the audible sound signal of the specified digital code corresponding to the bit error rate to the side of the subscriber circuit 7 from the talking circuit switch 9. The talking circuit control device 10, which has received (step 207) the measurement result information output from the bit error rate measurement device 14 in the step 205, indicates (step 208) the talking circuit switch 9 to cut off the path for the bit error rate measurement device 14 and connect the audible sound transmission device 13 with the subscriber circuit 7 and simultaneously informs the switching information to the central control device 11. By this information, the central control device 11 indicates reflection releasing to the subscriber circuit 7 and indicates (step 209) to form the talking circuit connecting the subscriber line 1, the network terminating device 2 and the customer station bus 4. As the result, the telephone 5 receives (step 210) the audible sound signal sent out in the procedure 206 through the talking circuit path formed in the step 208 and the step 209, that is through the audible sound transmission device 13, talking circuit switch 9, subscriber circuit 7, network terminating device and terminal adapter 3.

Similarly to the case of the first specified telephone number, the maintenance personnel on the side of the customer station knows the bit error rate is good when listening sound of 400 Hz, and knows the bit error rate is bad when listening sound of 1000 Hz. The indication condition of the result is released (step 211) by the cut signal from the calling telephone 5.

Thus, by the result of the reflection test using the first and second specified telephone numbers in this embodiment, the transmission deterioration in the subscriber line, faults or deterioration of function in the subscriber circuit can be known through the difference of the reflection paths. If the bit error rate is deteriorated in the reflection test using the first specified telephone number and the bit error rate is good in the reflection test using the second specified telephone number, it can be decided by the difference of the reflection paths that the subscriber line 1 has some malfunction (earth fault, connection to a commercial electric source or contact between subscriber lines). Also, if the bit error rate is deteriorated in the reflection test by using the first specified telephone number and the bit error rate is deteriorated in the reflection test by using the second specified telephone number, it can be decided that the subscriber circuit 7 at least has some malfunction.

Further, in this embodiment, the measurement results are set in two kinds of audible sound that is 400 Hz and 1000 Hz, in general more kinds of frequencies are used and more detailed measurement results are informed.

When this invention is applied for the ISDN (Integrated Service Digital network), the dial code from a network terminating device to an exchange is included in a calling demand messaged or it is possible to newly set up a message for maintenance. The reflection indication and reflection releasing indication through a subscriber line can use a different channel for maintenance to a talking channel and a control channel.

I claim:

1. A subscriber line test system for testing a subscriber circuit and a subscriber line that connect customer station equipment and an exchange, comprising:

network terminating means for, when receiving a first reflection command through said subscriber line, terminating a communication channel to be tested between said customer station equipment and said subscriber line and connecting a transmission channel and a reception channel of said communication channel on a side of said subscriber line to form a first reflection circuit including said transmission channel and said reception channel, and releasing said first reflection circuit and restoring said communication channel when receiving a first reflection release command through said subscriber line;

subscriber circuit means for, when receiving a second reflection command through said subscriber line, terminating said communication channel between said subscriber line and a communication channel switch of said exchange and connecting said transmission channel and said reception channel of said communication channel on a side or said communication channel switch to form a second reflection circuit including said transmission channel and said reception channel, and releasing said second reflection circuit and restoring said communication channel when receiving a second reflection release command through said subscriber line;

bit error rate measurement means for when receiving a first start command, transmitting a bit string signal through said transmission channel of said first reflection circuit, receiving this transmitted bit string signal from said reception channel of said first reflection circuit, measuring a first bit error rate by comparing said transmitted bit string signal with said received bit string signal and outputting a first bit error rate signal indicative thereof, and when receiving a second start command, transmitting a bit string signal through said transmission channel of said second reflection circuit, receiving this transmitted bit string signal from said reception channel of said second reflection circuit, measuring a second bit error rate by comparing said transmitted bit string signal with said received bit string signal and outputting a second bit error rate signal indicative thereof;

audible sound transmission means for transmitting first audible sound data corresponding to said first bit error rate signal through said communication channel when receiving a first audible sound transmission command, and for transmitting second audible sound data corresponding to said second bit error rate through said communication channel when receiving a second audible sound transmission command; and control means for when receiving a first specified address code from said customer station equipment, outputting an indication to said communication channel switch to connect said bit error rate measurement means to said first reflection circuit, and outputting said first reflection command and said first start command, outputting said first reflection release command and said first audible sound transmission command when receiving said first bit error rate signal, when receiving a second specified address code from said customer station equipment, outputting an indication to said communication channel switch to connect said bit error rate measurement means to said second reflection circuit, and outputting said second reflection command and said second start command, and outputting said second reflection release command and said second audible sound transmission command when receiving said second bit error rate signal, wherein said control means controls said communication channel switch and said subscriber circuit means through a system bus.

2. A subscriber line test system for testing a subscriber circuit and a subscriber line that connect customer station equipment and an exchange, comprising:

network terminating means for, when receiving a first reflection command through said subscriber line, terminating a communication channel to be tested between said customer station equipment and said subscriber line and connecting a transmission channel and a reception channel of said communication channel on a side of said subscriber line to form a first reflection circuit including said transmission channel and said reception channel, and releasing said first reflection circuit and restoring said communication channel when receiving a first reflection release command through said subscriber line;

subscriber circuit means for, when receiving a second reflection command through said subscriber line, terminating said communication channel between said subscriber line and a communication channel switch of said exchange and connecting said transmission channel and said reception channel of said communication channel on a side of said communication channel switch to form a second reflection circuit including said transmission channel and said reception channel, and releasing said second reflection circuit and restoring said communication channel when receiving a second reflection release command through said subscriber line, wherein said communication channel switch comprises:

bit error rate measurement means for when receiving a first start command, transmitting a bit string signal through said transmission channel of said first reflection circuit, receiving this transmitted bit string signal from said reception channel of said first reflection circuit, measuring a first bit error rate by comparing said transmitted bit string signal with said received bit string signal and outputting a first bit error rate signal indicative thereof, and when receiving a second start command, transmitting a bit string signal through said transmission channel of said second reflection circuit, receiving this transmitted bit string signal from said reception channel of said second reflection circuit, measuring a second bit error rate by comparing said transmitted bit string signal with said received bit string signal and outputting a second bit error rate signal indicative thereof; and audible sound transmission means for transmitting first audible sound data corresponding to said first bit error rate signal through said communication channel when receiving a first audible sound transmission command, and for transmitting second audible sound data corresponding to said second bit error rate through said communication channel when receiving a second audible sound transmission command; and control means for when receiving a first specified address code from said customer station equipment, outputting an indication to said communication channel switch to connect said bit error rate measurement means to said first reflection circuit, and outputting said first reflection command and said first start command, outputting said first reflection release command and said first audible sound transmission command when receiving said first bit error rate signal, when receiving a second specified address code from said customer station equipment, outputting an indication to said communication channel switch to connect said bit error rate measurement means to said second reflection circuit, and outputting said second reflection command and said second start command, and outputting said second reflection release command and said second audible sound transmission command when receiving said second bit error rate signal.

3. A subscriber line test system for testing a subscriber circuit and a subscriber line that connect customer station equipment and an exchange, comprising:

network terminating means for, when receiving a first reflection command through said subscriber line, terminating a communication channel to be tested between said customer station equipment and said subscriber line and connecting a transmission channel and a reception channel of said communication channel on a side of said subscriber line to form a first reflection circuit including said transmission channel and said reception channel, and releasing said first reflection circuit and restoring said communication channel when receiving a first reflection release command through said subscriber line;

subscriber circuit means for, when receiving a second reflection command through said subscriber line, terminating said communication channel between said subscriber line and a communication channel switch of said exchange and connecting said transmission channel and said reception channel of said communication channel on a side of said communication channel switch to form a second reflection circuit including said transmission channel and said reception channel, and releasing said second reflection circuit and restoring said communication channel when receiving a second reflection release command through said subscriber line;

bit error rate measurement means for
- when receiving a first start command, transmitting a bit string signal through said transmission channel of said first reflection circuit, receiving this transmitted bit string signal from said reception channel of said first reflection circuit, measuring a first bit error rate by comparing said transmitted bit string signal with said received bit string signal and outputting a first bit error rate signal indicative thereof, and
- when receiving a second start command, transmitting a bit string signal through said transmission channel of said second reflection circuit, receiving this transmitted bit string signal from said reception channel of said second reflection circuit, measuring a second bit error rate by comparing said transmitted bit string signal with said received bit string signal and outputting a second bit error rate signal indicative thereof;

audible sound transmission means for transmitting first audible sound data corresponding to said first bit error rate signal through said communication channel when receiving a first audible sound transmission command, and for transmitting second audible sound data corresponding to said second bit error rate through said communication channel when receiving a second audible sound transmission command, wherein said audible sound transmission means comprises:

clock signal generator means for generating a reference clock signal;

counter means for counting based on said reference clock signal;

memory means for receiving data representing an address thereof based on a value output from said counter means and a signal output from said bit error rate measurement means and outputting data representing one of a first audible sound corresponding to said first bit error rate and a second audible sound corresponding to said second bit error rate; and a time slot converter means for transmitting said data output from said memory means through said communication channel during a time period; and control means for
- when receiving a first specified address code from said customer station equipment, outputting an indication to said communication channel switch to connect said bit error rate measurement means to said first reflection circuit, and outputting said first reflection command and said first start command,
- outputting said first reflection release command and said first audible sound transmission command when receiving said first bit error rate signal,
- when receiving a second specified address code from said customer station equipment, outputting an indication to said communication channel switch to connect said bit error rate measurement means to said second reflection circuit, and outputting said second reflection command and said second start command, and
- outputting said second reflection release command and said second audible sound transmission command when receiving said second bit error rate signal.

4. A subscriber line test system as claimed in claim 3, wherein said memory means stores said data as a digital pattern of an audible sound of desired frequency.

* * * * *

UNITED STATES PATENT AND TRADEMARK OFFICE
CERTIFICATE OF CORRECTION

PATENT NO.  : 5,410,585
DATED       : April 25, 1995
INVENTOR(S) : Satoru Kawaharata It is certified that error appears in the above-indentified patent and that said Letters Patent is hereby corrected as shown below:

Column 5, line 42 and 43, delete "terminal adaptors to the same terminal adapters" and insert --terminal adapter 3 to the same terminal adapter 3--.

Column 6, line 26, after "17" insert --in which audible sound data represents an audible frequency--.

Column 6, lines 29 and 30, after "nonvolatile memory" delete "which audible" sound data, representing an audible frequency line"

Signed and Sealed this

Twenty-fourth Day of October, 1995

Attest:

BRUCE LEHMAN

Attesting Officer      Commissioner of Patents and Trademarks